United States Patent Office 3,170,963
Patented Feb. 23, 1965

3,170,963
ENAMEL COMPOSED OF A VINYL RESIN WITH EPOXIDE GROUPS GRAFTED THEREON
Abraham Ravve, Chicago, and Joseph T. Khamis, Brookfield, Ill., assignors to Continental Can Company, Inc., New York, N.Y., a corporation of New York
No Drawing. Filed May 23, 1960, Ser. No. 30,739
18 Claims. (Cl. 260—830)

This invention relates to polyvinyl halide enamels having thermosetting properties and having adhesion properties resistant to contact with water vapor under hot processing conditions.

Enamels containing vinyl polymers are known. A difficulty has been that the enamel, when employed for example as an inside coating for a foodstuff can, loses adhesion during hot processing of the foodstuff in the can. Another difficulty has been the low shear-tensile strength of enamels based on polyvinyl halide polymers and copolymers.

It has been found that when an enamel base having a polyvinyl halide backbone with grafted branches of bifunctional components is heated in the presence of an amine or carboxylic acid curing agent which itself is solid at normal temperature and which may be thermoplastic, is baked, the cured film has high adhesion and great strength and resists processing conditions such as steam autoclaving.

An object of this invention is the provision of an enamel composition which may be baked to a thermostat form and is then resistant to processing conditions.

Another object is the provision of an enamel coating on a metal substrate which is strongly adherent thereto even under steam autoclaving conditions.

A further object is the provision of an enamel coating on a metal substrate which has the characteristics of a polyvinyl halide enamel, which is strongly adherent even under steam autoclaving conditions, and which has high strength.

A further object is the provision of an enamel coating composition which may be baked under conditions not endurable to commercial polyvinyl chloride compositions, and which forms a baked residue which is strongly adherent even under steam autoclaving conditions.

With these and other objects in view, as will appear in the course of the following description and claims, illustrative embodiments of the invention will be set out.

PREPARATION OF GRAFTED POLYVINYL COMPOUND

Vinyl halide resins are reacted with an organic compound containing an epoxy group and a vinyl group, such as butadiene monooxide, epoxidized polybutadiene, glycidyl methacrylate, glycidyl acrylate, dipentene oxide and glycidyl vinyl ether, in the presence of a free-radical producing agent such as benzoyl peroxide, methyl ethyl ketone peroxide, cumene hydroperoxide, acetyl peroxide, and azobisisobutyronitrile; with a solvent such as a ketone, aromatic hydrocarbon, chlorohydrocarbon such as chloroform or carbon tetrachlordie, and the aliphatic hydrocarbons and esters which can dissolve the polyvinyl resin. The reaction proceeds significantly upon heating the components, in an inert organic solvent, for six hours at 60 degrees C. There appears an inverse time:temperature relationship, by which heating at 80 degrees C. for four hours, or at 100 degrees C. for two hours with benzoyl peroxide, or at 60 degrees C. for four hours with acetyl peroxide, gives a product with the desired physical properties, e.g., of forming by itself an enamel composition for metal coating which has good heat resistance and good adhesion upon baking at 350 degrees F. for 14 minutes. The mechanism of the reaction appears to be that the peroxide catalyst generates free radicals which attack double bonds on the vinyl polymer or on the epoxyvinyl compound, and create new free radicals, or it may create a free radical upon the vinyl polymer by abstracting a proton.

As an example, 29.6 pounds of vinyl chloride: vinyl acetate polymer (87:13 ratio) are combined with 2.96 pounds of glycidyl methacrylate monomer (free of inhibitor), 0.10 pound of benzoyl peroxide, and 59.0 pounds of anhydrous methyl ethyl ketone. The mixture is heated to 80 degrees C., with stirring, in a reaction kettle under a nitrogen atmosphere for four hours. The modified polymer is precipitated with isopropyl alcohol, separated, washed with isopropyl alcohol, and dried.

As another example, 150 grams of the same vinyl copolymer are combined in 400 liters of dry acetone with 15 grams of dipentene monooxide, 0.25 gram of acetyl peroxide, and 0.1 gram of ascorbic acid, in a reaction flask, and heated to 60 degrees C., with refluxing, for eight hours. The product was precipitated, washed and dried as before.

As a further example, 150 grams of vinylidene chloride:vinyl chloride copolymer (15:85 ratio) were dissolved in 400 millimeters of dry toluene, and combined in a resin kettle with 30 grams of glycidyl methacrylate, and 1.8 grams of benzoyl peroxide. The mixture was stirred and heated, with a nitrogen atmosphere, for four hours at 80 degrees C. The product was precipitated, washed and dried as before.

Each of the products can be dissolved in appropriate solvents such as ketones, aromatic hydrocarbons, or mixtures thereof, to produce solutions of 20 percent solids and a viscosity of the order of 50 cps. and employed as a metal coating enamels, with baking in an oven for three to 15 minutes at 360 degrees F. Each can be described as having the molecular form of a polyvinyl halide backbone with bifunctional branches grafted thereto; usually having branch-extending polymers of the bifunctional group employed.

PREPARATION OF A PHENOLIC AMINE RESIN 470 grams of phenol (hydroxybenzene: molecular weight 94; 5.0 moles employed) were introduced with 1,040 grams of 36 percent aqueous formaldehyde solution (375 grams formaldehyde: molecular weight 30; 12.5 moles employed) into a three-necked flask fitted with a thermometer and a stirrer, set up in a cold water bath to remove heat of reaction. 760 grams of 28 percent aqueous ammonia solution (212.5 grams ammonia: molecular weight 17; 12.5 moles employed) were added slowly with stirring, the temperature being kept below 50 degrees C. The reaction mixture was then heated for one hour at 60 degrees C., followed by one hour at 80 to 85 degrees C. The batch was then dehydrated at about 35 to 40 degrees C. under a vacuum of 29 inches of mercury. 500 milliliters of amyl alcohol were added: and azeotropic distillation effected at 32 degrees C. under the same vacuum: 100 milliliters of amyl alcohol were added, and the azeotropic distillation continued to complete elimination of water. In the final stages of the dehydration, the pot temperature was raised to about 65 degrees C. to assure dissolution of lumps of the wet resin. Excess amyl alcohol was distilled off until the batch foamed. Upon completion, the solution of the phenolic amine resin was crystal clear, with 64 percent solids.

PREPARATION AND USE OF COATING COMPOSITION

A polyvinyl halide compound, with the bifunctional branches grafted thereon, is then mixed with a curing material for producing a baked enamel of thermoset properties.

Example 1

A solution in a mixture of toluene and acetone was prepared, containing 25 percent by weight of solids composed of polyvinyl chloride:acetate (85:15 ratio) with grafts from glycidyl methacrylate thereon so that about every third vinyl link had a grafted branch, and of phenolic amine resin prepared as above. 10 percent of the solids were the phenolic amine resin and the rest the grafted polyvinyl resin. Pigments and coloring matter may be added.

The solution was applied to a tin-plate sheet by brush: and baked at 360 degrees F. for 15 minutes. The enamel coating was adherent, and withstood autoclaving for an hour at 15 pounds steam pressure and 250 degrees F. without peeling off: demonstrating utility as an inside liner for a can to contain a foodstuff requiring processing for sterilization.

In general, the solvents for the coating composition can be selected from solvents effective with polyvinyl halide copolymers: including aromatic solvents, ketonic solvents, glycol alkyl ethers, 2-nitropropane, and mixtures thereof.

The proportions of solids in the coating solution can be from 5 to 35 percent, depending upon the conditions of use such as spray, brush or roller application, the nature and temperature of the substrate at application, and the solvent selected.

The ratio of the solids components can be from 50 to 95 percent by weight of the grafted polyvinyl compound to 50 to 5 percent by weight of the curing agent.

A characteristic of the baked coating is its ability to withstand steam. The above example is typical in its resistance for an hour to steam at 240 degrees F. and 15 pounds pressure. The cross-linking makes the coating impervious to steam: and many specimens withstand 250 degrees F. of dry steam without failure. The blush resistance and maintained adhesion are greatly improved over existing commercial vinyl coating compounds, noting that these are well known to fail during steam processing. The thermoset structure is shown by the changes in solubility after baking.

The conditions of baking can be varied, and are not critical as to time:temperature factor. Baking has been done at 360 to over 600 degrees F. Desirable coordinations of time and temperature are 3 to 15 minutes at 400 to 415 degrees F., or 3 to 5 seconds at 525 to 600 degrees F., for the known oven and flash bakings. The optima for the composition of Example 1 were about 10 minutes at 400 degrees F. or 4 seconds at 560 degrees F.

By comparison, the polyvinyl enamels of commerce completely decompose under such conditions.

*Example 2*

A solution of the grafted polyvinyl resin was prepared as in Example 1, but 10 percent by weight of ureaformaldehyde resin was employed in lieu of the phenolic amine resin. Either unmodified or butylated urea-formaldehyde resin may be used. The coating composition was applied and baked as before, to yield a cured coating having like characteristics.

*Example 3*

A like solution was prepared, with methyl-(endocis-bicyclo-2,2,1)-5-heptene-2,3-dicarboxylic anhydride. The cured coatings had like characteristics.

These examples indicate that the curing of the grafted polyvinyl resin to a strongly cross-lined condition can be effected in the presence of non-volatile and normally solid organic curing additives which have amine groups, carboxylic acids (or acid anhydrides), and which may be of alkaline or acidic nature.

Comparative behaviors of enamels of the instant compositions, of the grafted polyvinyl compound above, and of a commercial polyvinyl chloride copolymer are shown in Table I.

TABLE I

|  | Impact | S-T | Elong. | Process Adh. | Solv. |
|---|---|---|---|---|---|
| A. Commercial Can Enamel | 7 | $4.33 \times 10^3$ | 2.05 | 32.0 | 24.40 |
| B. Graft Copolymer | 5 | $5.89 \times 10^3$ | 2.23 | 3.2 | 9.79 |
| C. Same, crosslinked by amino resin | 6 | $1.22 \times 10^4$ | 2.08 | 1.5 | 0.0 |
| D. Same, crosslinked by acid anhydride | 5 |  |  | 1.0 | 3.79 |

In the above Table I, "Impact" indicates the General Electric impact flexibility rating, by station at which failure occurred, with "1" designating the most brittle, and "8" the most flexible. "S-T" indicates the Shear-Tensile strength in pounds per square inch, with test movement of 2 inches per minute. "Elong." indicates the elongation in percent upon stretching at the rate of 2 inches per minute. "Process Adh." indicates the area failure, in percent, upon subjection to steam at 240 degrees F., 10 pounds per square inch, for one hour. "Solv." indicates the solvent sensitivity, by percent extracted, upon subjection to boiling carbon tetrachloride for 30 minutes. Test A was of a currently employed commercial metal enamel of polyvinyl chloride, epoxy resin, with urea-formaldehyde, after baking. Test B was of a baked graft copolymer (intrinsic viscosity 0.42) of glycidyl methacrylate upon a polyvinyl backbone of copolymerized vinyl chloride:vinyl acetate in the ratio of 87:13 and with an intrinsic viscosity of 0.53 before grafting, the copolymer backbone available commercially under the name VYHH being used. Test C was of the same graft polymer as in Test B, to which a phenolic amine resin (14% nitrogen) had been added before application, the nitrogen being present in a secondary amine form as $OH \cdot C_6H_4 \cdot CH_2 \cdot NH \cdot CH_2 \cdot C_6H_4 \cdot OH$. Test D was of the same graft polymer as in Test B, to which methyl (endo-cis-bicyclo-2,2,1)-5-heptene-2,3 - dicarboxylic anhydride had been added before application. Identical coating and baking procedures were employed, for the comparisons. The effect of the cross-linkage during baking, in Tests C and D, is notable in attaining low solvent extractibility and high shear-tensile strength.

The reaction of cross-linking during the baking probably occurs in two steps. Thus the graft copolymer can be represented as (1)
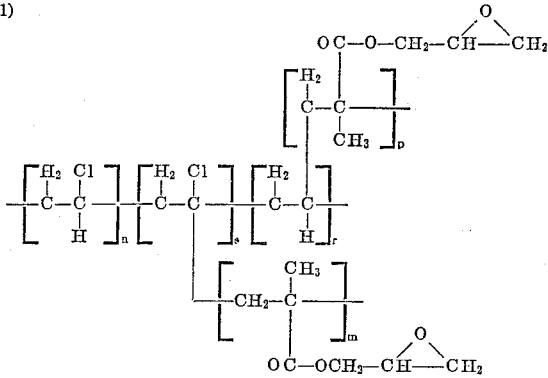

and the phenolic amine as:

(2)
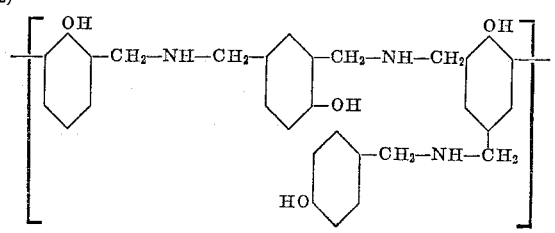

where $m$, $n$, $p$, $r$, $s$ and $t$, as usual, denote that multiples of the bracketed groups or links are present.

The stages of reaction can probably be represented:

(3)

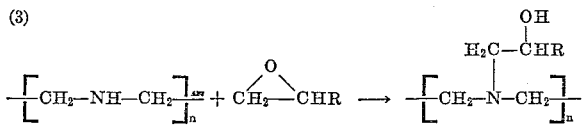

where R denotes the rest of an epoxy molecule introduced.

(4)

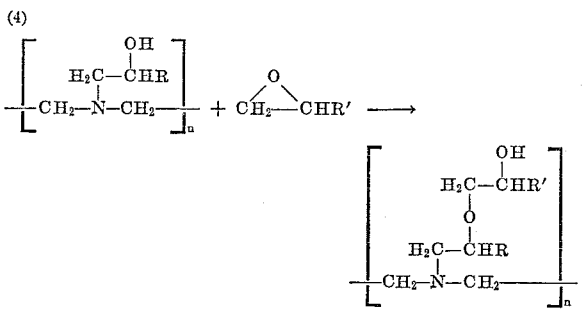

where R' denotes the rest of the indicated epoxy molecule.

The reactions involve the coupling of the secondary amine group to a terminal epoxy group, with succeeding increase of the branch length by the action of another terminal epoxy group at the hydroxyl of initial grafted branch. Such reactions can repeat so long as epoxy groups are present: and constitute cross-linkages between the various molecules having the R,R', etc., groups therein.

The illustrative embodiments are not restrictive, and the invention may be practiced in many ways within the scope of the appended claims.

What is claimed is:

1. A thermosetting enamel composition comprising a solution in a volatile organic solvent of a branch-grafted vinyl chloride resin, said resin having a backbone selected from the group consisting of the homopolymer of vinyl chloride, the copolymer of vinyl chloride with vinyl acetate and the copolymer of vinyl chloride with vinylidene chloride, and having on said backbone grafted branches containing epoxy groups, said branches being derived by graft polymerization onto the backbone of organic substances having ethylenic unsaturation therein and bearing at least one oxirane ring and selected from the class consisting of butadiene monoxide, epoxidized polybutadiene, glycidyl methacrylate, glycidyl acrylate, dipentene oxide and glycidyl vinyl ether; and a non-volatile organic curing agent selected from the group consisting of phenolic amine resins, urea formaldehyde resins, polycarboxylic acids and the anhydrides of polycarboxylic acids.

2. A thermostat composition comprising the product of baking a branch-grafted vinyl chloride resin in the presence of a non-volatile organic curing agent selected from the group consisting of phenolic amine resins, urea formaldehyde resins, polycarboxylic acids and the anhydrides of polycarboxylic acids, said vinyl chloride resin having a backbone selected from the group consisting of the homopolymer of vinyl chloride, the copolymer of vinyl chloride with vinyl acetate and the copolymer of vinyl chloride with vinylidene chloride, and having on said backbone grafted branches containing epoxy groups, said grafted branches being derived from polymerization of organic substances having ethylenic unsaturation therein and bearing at least one oxirane ring and selected from the class consisting of butadiene monoxide, epoxidized polybutadiene, glycidyl methacrylate, glycidyl acrylate, dipentene oxide and glycidyl vinyl ether.

3. The composition as in claim 1, in which the curing agent is a phenolic amine resin.

4. The composition as in claim 1, in which the curing agent is a urea:formaldehyde resin.

5. The composition as in claim 1, in which the curing agent is methyl-(endo-cis-bicyclo-2,2,1)-5-heptane-2,3-dicarboxylic anhydride.

6. The composition as in claim 1, in which the grafted vinyl chloride resin has a backbone of the vinyl chloride copolymer, and the branches are formed from glycidyl methacrylate groups.

7. The composition as in claim 1, in which the grafted vinyl chloride resin has a backbone of the vinyl chloride copolymer, and the branches are formed from butadiene monoxide groups.

8. The composition as in claim 1, in which the grafted vinyl chloride resin has a backbone of the vinyl chloride copolymer, and the branches are formed from glycidyl acrylate groups.

9. The composition as in claim 1, in which the grafted vinyl chloride resin has a backbone of vinyl chloride:vinyl acetate copolymer, and the branches are formed from glycidyl methacrylate groups.

10. The composition as in claim 1, in which the grafted vinyl chloride resin has a backbone of vinyl chloride:vinyl acetate copolymer, and the branches are formed from dipentene oxide.

11. The composition as in claim 2, in which the curing agent is a phenolic amine resin.

12. The composition as in claim 2, in which the curing agent is a urea-formaldehyde resin.

13. The composition as in claim 2, in which the curing agent is methyl-(endo-cis-bicyclo-2,2,1)-5-heptane-2,3-dicarboxylic anhydride.

14. The composition as in claim 2, in which the grafted vinyl chloride resin has a backbone of vinyl chloride copolymer, and the branches are formed from glycidyl methacrylate groups.

15. The composition as in claim 2, in which the grafted vinyl chloride resin has a backbone of vinyl chloride copolymer, and the branches are formed from butadiene monoxide groups.

16. The composition as in claim 2, in which the grafted vinyl chloride resin has a backbone of vinyl chloride copolymer, and the branches are formed from glycidyl acrylate groups.

17. The composition as in claim 2, in which the grafted vinyl chloride resin has a backbone of vinyl chloride:vinylidene chloride copolymer, and the branches are formed from glycidyl methacrylate groups.

18. The composition as in claim 2, in which the grafted vinyl chloride resin has a backbone of vinyl chloride copolymer, and the branches are formed from dipentene oxide.

References Cited in the file of this patent
UNITED STATES PATENTS

| | | |
|---|---|---|
| 2,190,776 | Ellingboe et al. | Feb. 20, 1940 |
| 2,454,209 | Rogers et al. | Nov. 16, 1948 |
| 2,609,355 | Winkler | Sept. 2, 1952 |
| 2,837,496 | Vandenberg | June 3, 1958 |
| 2,908,662 | Rees | Oct. 13, 1959 |
| 3,011,909 | Hart et al. | Dec. 5, 1961 |